May 3, 1927.
G. E. MAIER
CHARGING VALVE
Filed June 18, 1924
1,627,443
4 Sheets-Sheet 1
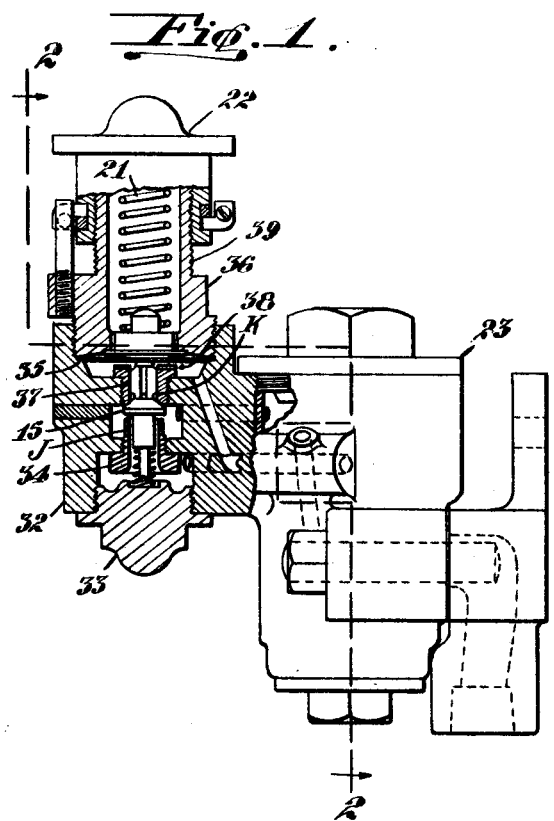
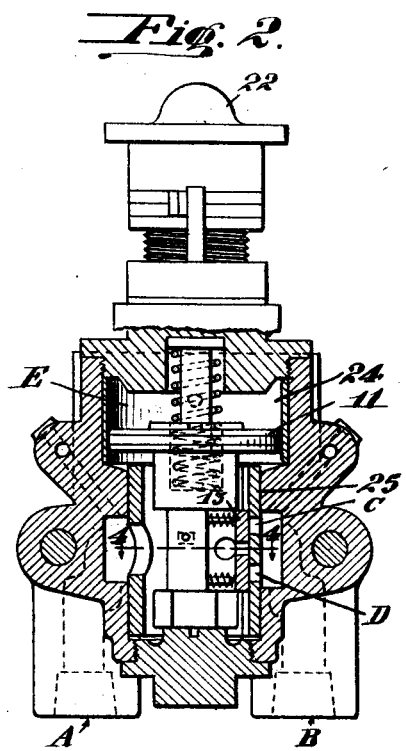
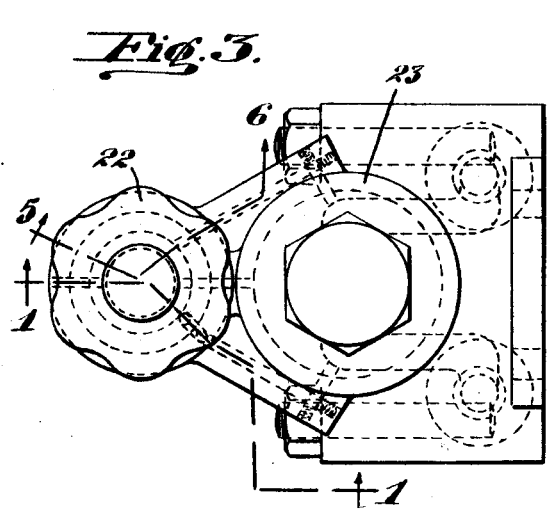
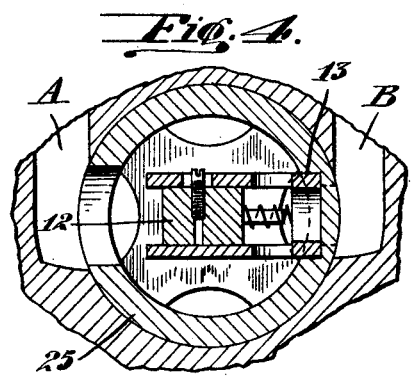
Inventor
George E. Maier;
By R. S. Berry,
Attorney May 3, 1927. 1,627,443
G. E. MAIER
CHARGING VALVE
Filed June 18, 1924     4 Sheets-Sheet 2
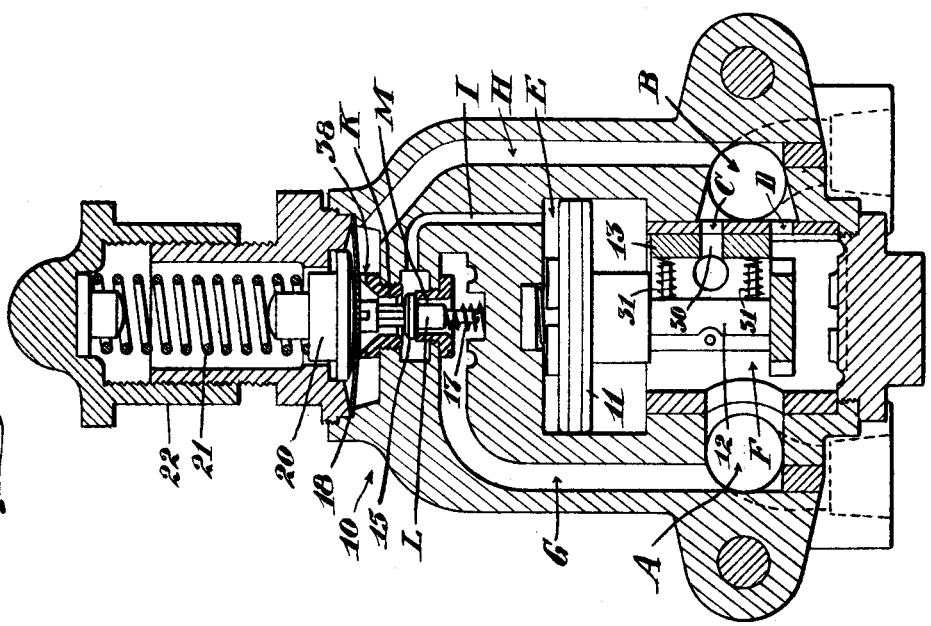
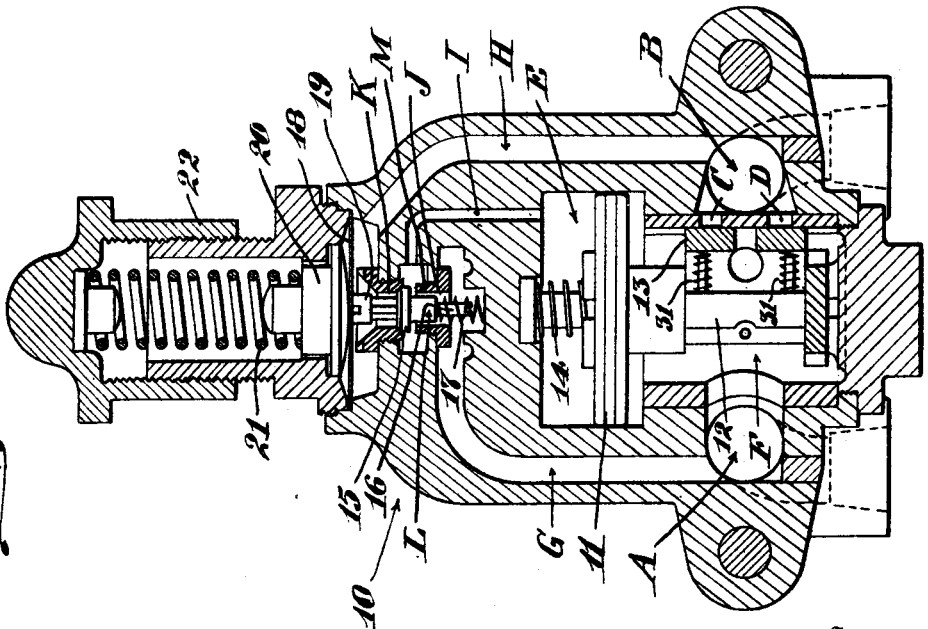
Inventor
George E. Maier;
By
Attorney

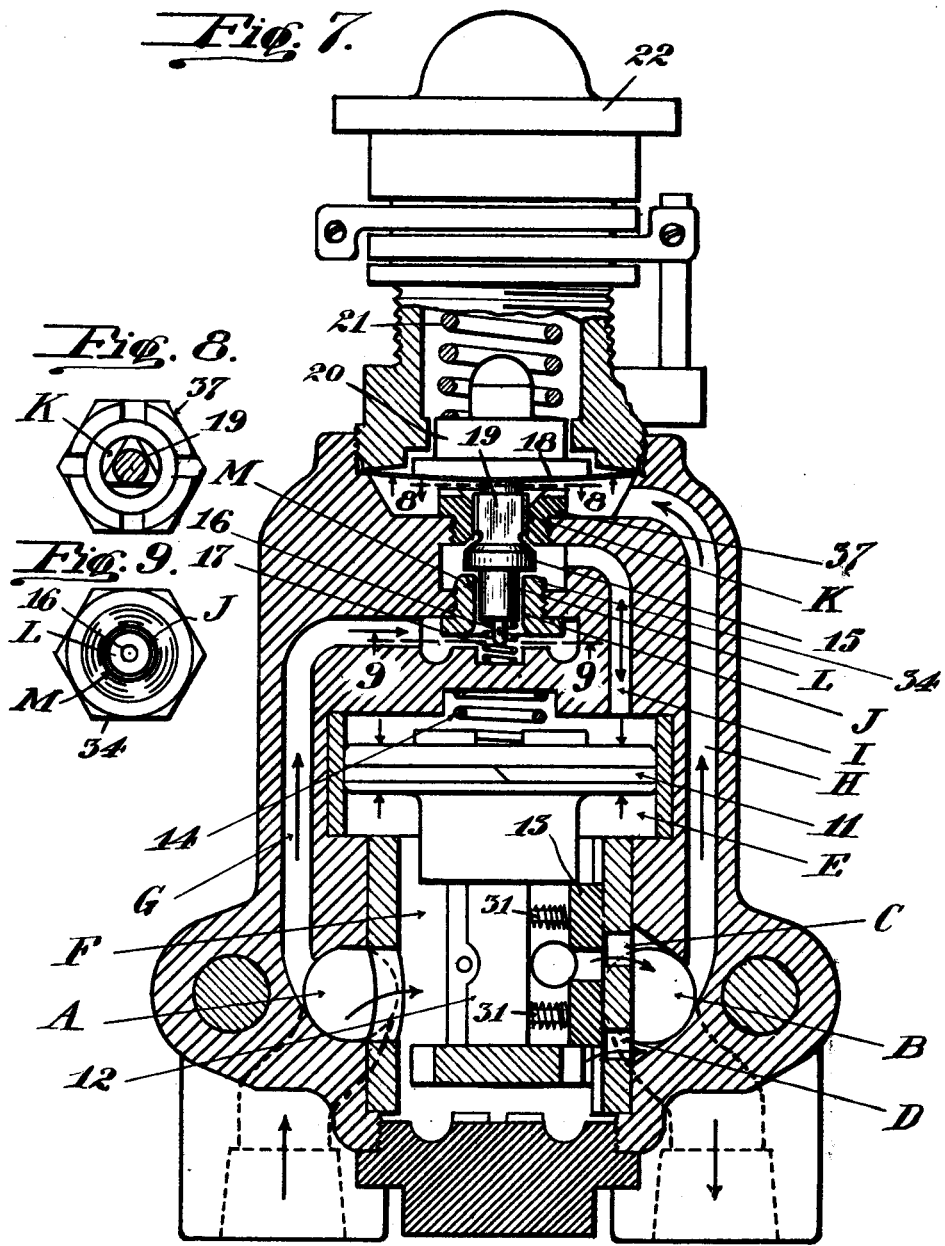

May 3, 1927.                G. E. MAIER                1,627,443
                           CHARGING VALVE
                        Filed June 18, 1924        4 Sheets-Sheet 4
Fig. 10.                                Fig. 11.
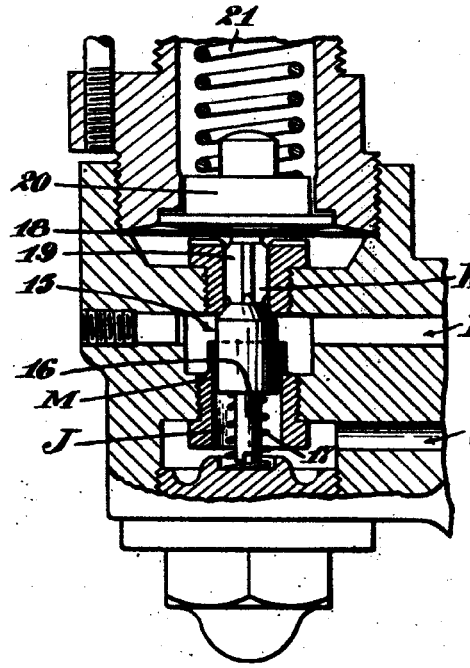
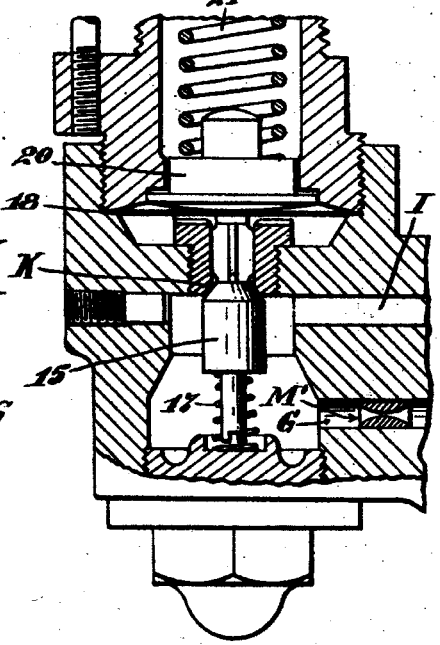
Fig. 12.                                Fig. 13.
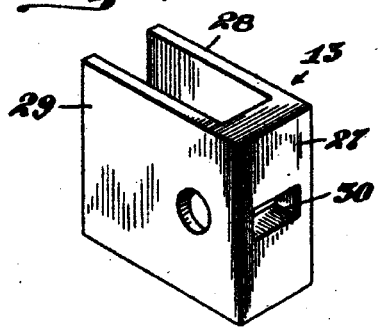
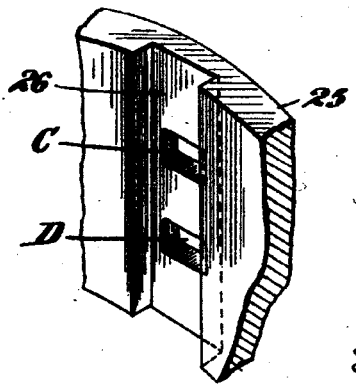
Inventor
George E. Maier
By R. S. Berry
Attorney Patented May 3, 1927.

1,627,443

UNITED STATES PATENT OFFICE.

GEORGE E. MAIER, OF LOS ANGELES, CALIFORNIA, ASSIGNOR TO WESTINGHOUSE AIR BRAKE COMPANY, OF WILMERDING, PENNSYLVANIA, A CORPORATION OF PENNSYLVANIA.

CHARGING VALVE.

Application filed June 18, 1924. Serial No. 720,772.

This invention particularly pertains to improvements in the charging valve disclosed in United States Letters Patent Number 1,406,466, issued to me February 14th, 1922, which is adapted to be employed in air brake equipment, especially applicable to the type commonly known as the Westinghouse No. 6 ET locomotive brake equipment, and which charging valve is also especially applicable for use in the air brake equipment set forth in my co-pending application for Letters Patent filed April 2, 1924, and bearing Serial Number 703,726.

My present invention especially appertains to the construction and mode of operation of the regulating valve employed in the charging valve and the primary object thereof is to provide a regulating valve and associated parts which are so constructed and operated as to render the charging valve sensitive to slight variations of pressure on the outlet side of the charging valve and give it quicker action and greater capacity.

Another object is to provide a construction whereby the regulating valve may be readily removed and replaced.

A further object is to provide a charging valve which is highly efficient and dependable in operation and in which the parts are so constructed and arranged as to reduce to a minimum the possibility of the charging valve becoming fouled and its proper operation inhibited by accumulations of foreign matter therein thereby obviating the necessity of frequent dismantling of the parts for cleaning thereof.

With the foregoing objects in view, together with such other objects and advantages as may subsequently appear, my invention resides in the parts, and in the construction, combination and arrangement of parts as hereinafter described and claimed, and illustrated by way of example in the accompanying drawings, in which—

Figure 1 is a view of the charging valve in side elevation and partly in vertical section with portions broken away, as seen on the line 1—1 of Figure 3.

Figure 2 is a view in section and elevation as seen on the line 2—2 of Figure 1.

Figure 3 is a plan view.

Figure 4 is a detail in horizontal section as seen on the line 4—4 of Figure 2.

Figures 5, 6 and 7 are diagrammatic sectional views taken on line 5—6 of Figure 3, illustrating the operation of the charging valve.

Figure 8 is a detail in plan as seen on the line 8—8 of Figure 7;

Figure 9 is an inverted plan view as seen on the line 9—9 of Figure 7.

Figures 10 and 11 are details depicting modified forms of the regulating valve.

Figure 12 is a perspective view of the slide valve.

Figure 13 is a perspective view of the slide valve seat.

While like reference characters are employed to designate corresponding parts throughout the several views, attention is particularly directed to the diagrammatic sections shown in Figures 5, 6 and 7 which illustrate the operative mechanism and the associated air passages and chambers, 10 indicating the body of the charging valve which is formed with an inlet chamber A, an outlet chamber B, ports C and D for connecting the chambers A and B, a piston chamber E opening at its lower end to a slide valve chamber F communicating with the inlet chamber A, auxiliary passages G and H leading from the inlet and outlet chambers, respectively, and terminating in spaced superposed relation above the piston chamber E, a passage I leading from the upper end of the piston chamber and extending intermediate the superposed portions of the chambers G and H. Opposed ports J and K connect the intermediate passage I with the passages G and H, respectively.

Mounted in the piston chamber E is a piston 11 fitted with a stem 12 extending downwardly into the chamber F and connecting with a slide valve 13 controlling the ports C and D to open and close communication between the inlet and outlet chambers. A controlling spring 14 acts to normally dispose the piston 11 in a lowermost position, as shown in Figure 5, in which position the slide valve 13 will close the ports C and D; the spring 14 also serving to assist in controlling the movement of the piston 11 and the port opening of the slide valve 13 when the piston is in an intermediate position as shown in Figure 7. The spring 14 is here shown as located in the piston chamber E and bearing between the upper wall of the latter and the top of the piston. The spring acts to assist in controlling the movement of the piston and the slide valve port opening when the air pressure above the piston reduces or increases and to force the piston to and maintain it in its lowermost position when the air pressure on the opposite sides of the piston is substantially equal.

Mounted in the intermediate passage I between the ports J and K is a regulating valve 15 fitted with a guide extending into port K affording unrestricted air flow to the outlet chamber and a choking device L, extending into port J affording a choking means to the air from the inlet chamber, and with a stem 16 which projects through the port J into the passage G around which stem is arranged a spring 17 adapted to keep the regulating valve bearing firmly against the diaphragm in all open positions or to normally maintain the regulating valve in its uppermost position and to close the port K so that air under pressure may pass from the inlet chamber A through passage G, port J and passage I to the upper portion of the piston chamber E to equalize pressure above and below the piston 11; the air pressure below the piston 11 corresponding to that of the inlet chamber by reason of the latter opening direct and unrestricted to the lower portion of the piston chamber through the chamber F.

A feature of the present invention resides in a choking device affording retardation to the flow of air from the intake chamber A and passage G through port J and passage I to the upper end of the piston chamber E, relative to the flow of air from the piston chamber E through the port K to the outlet chamber B, which is effected by forming the ports J and K of different working areas; the port J being of substantially smaller working area than that of the port K and conversely the port K having a working area greater than that of the port J. This is accomplished as shown in Figures 1, 5, 6, 7 and 10 by forming the regulating valve 15 with a cylindrical portion L on its under side which projects into the port J and has its circumferential surface extending proximate to but not touching the annular wall of the port J which port is of such length and diameter so as to form an elongated annular narrow passage M between the valve member L and the inner wall surface of the port. This choked passage M may be in constant open communication with the passages G and I as shown in Figure 10 irrespective of the position of the regulating valve relative to the port K. However the regulating valve 15 may be double acting and may operate to completely close the port J when positioned to fully open port K as shown in Figure 6; the essential feature being to choke the flow of air through the port J when the latter is open. This choking may be accomplished other than by forming the regulating valve and the port J as above explained as for example the choking means may comprise a choke M' interposed in the passage G as shown in Figure 11. In any event the choking means is to have a working area less than the port opening of the regulating valve 15 and whereby fluid pressure flow will be retarded to the upper piston chamber. The regulating valve port K is to have a working area greater than that of the choking means from the moment the regulating valve 15 first cracks port K. The feature of the regulating valve closing the port J with the present invention is for the purpose of stopping the flow of air through the choking means when the charging valve is supplying a large volume of air to the outlet discharge, thereby assisting in keeping foreign substances inevitably present in the compressed air from clogging the choking means.

Arranged in the passage H above the regulating valve 15 is a diaphragm 18 against the under side of which abuts the guide 19 projecting upwardly from the regulating valve 15, which guide projects through the port K and is guided therein, and seating on the diaphragm opposite the guide 19 is a shoe 20 against which bears a spring 21 in opposition to outlet air pressure on the under side of the diaphragm. The tension of the spring 21 is adapted to be adusted by means of a screw cap 22 between which cap and the shoe 20 the spring 21 extends.

In the construction of the charging valve the various parts are preferably constructed and arranged as particularly shown in Figures 1, 2, and 3, that is, with the piston chamber E and the piston therein offset in relation to the regulating valve and with the operating elements moving vertically; the upper end of the piston chamber E being formed by a threaded cap 23 which when removed will give access to the chambers E and F and parts mounted therein. The piston chamber E is lined by a removable sleeve 24 and the slide valve chamber F is lined by a removable sleeve 25 in which the duplex ports C and D are formed; the sleeve 25 being provided with a vertical channel 26 on its inner face to which the ports C and D open as shown in Figure 13, and in which channel the slide valve 13 is guided. The slide valve 13 is of U-shape as shown in Figure 12, being formed with an end face 27 and parallel side walls 28 and 29, the end face having a single port 30 formed therein which is positioned to register with the port C when the slide valve is in its upper or open position at which time the lower edge of the end face 27 of the slide valve 13 will be positioned above the port D to open the latter. When the slide valve is in its lowermost position the port 30 will be disposed between and out of communication with the ports C and D and the end face 27 will extend over and close the ports C and D. By thus providing a double port opening for the slide valve the necessary movement thereof in effecting full opening of the communication between the inlet and outlet chambers is minimized thereby requiring but a short length of travel of the piston 11 and slide valve 13 thereby obviating placing the spring 14 under abnormal strain. Furthermore, this arrangement permits a precise and simultaneous graduation in the opening and closing of the ports C and D.

The piston stem 12 is formed with flat parallel side faces astride of which the side walls 28 and 29 of the slide valve extend as shown in Figure 4; the stem being provided with spaced shoulders which extend over the upper and lower ends of the walls 28 and 29 and retain the slide valve against vertical movement on the stem. The slide valve is slidable transversely of the stem and interposed between the stem and the end wall of the valve is a pair of springs 31 which serve to maintain the slide valve in close sliding contact with the bottom wall of the guide channel 26.

The regulating valve 15 is mounted in a horizontally extending portion 32 of the valve casing in which the terminations of the passages G, H, and I are formed; a cap 33 being screwed on the underside of the projecting portion opposite the port J the removal of which cap will give access to the regulating valve and its mounting. The port J is formed by a nipple 34 which is screwed into an opening in the wall separating the passages G and I; the nipple being screwed into place from the underside of the wall and thereby being adapted to be readily removed and replaced on removing the cap 33.

The upper portion of the projecting portion of the casing is formed with an opening having a marginal flange 35 on which seats the diaphragm 18, and in which opening is screwed a cap 36 adapted to be removed to give access to the diaphragm and the parts therebeneath. The port K is formed by a nipple 37 which is screwed into an opening in the wall separating the passages H and I, the nipple being screwed into the opening from the upper side of the wall so that it may be readily removed and replaced when the cap 36 is removed. The nipples 34 and 37 being screwed into place may be adjusted relative to each other to afford the proper spacing to accommodate the regulating valve. The upper end of the nipple 37 extends close to the under side of the diaphragm to limit its downward travel and in order to insure against it being closed by the diaphragm when the latter is depressed the upper end of the nipple is formed with radial channels 38 which lead outwardly from the interior of the nipple and open at their ends to the passage H.

The cap 36 is formed with a cylindrical extension 39 in which the spring 21 is disposed, and which extension is threaded to receive the cap 22 and whereby the tension of the spring 21 may be adjusted.

In the application and operation of the invention the inlet chamber A of the valve casing is connected to a source of air under pressure such as the main reservoir of the air brake equipment of a locomotive, and the outlet chamber B is connected to a pipe line leading to any suitable point of discharge to which air is to be automatically delivered through the charging valve from the main supply at a reduced pressure, either charging a storage or an air brake system to, and maintaining it precisely at, a predetermined adjusted reduced pressure or furnishing a constant volume flow of reduced pressure to the outlet discharge through the ports C and D, automatically supplying it uniformly for any volume required from the minimum to the maximum port opening precisely controlled by the movement of the piston and attached slide valve, and governed precisely by the tension of spring 21 acting on the diaphragm 18; the regulating valve and the supply valve operating in unison and synchronism for all operating charging positions. When the pressure on the outlet side of the charging valve is normal, the parts of the charging valve will be positioned as illustrated in Figure 5, that is, with the diaphragm 18 retracted by air pressure in the outlet chamber B and passage H in which position the regulating valve 15 will close port K. Main reservoir pressure in the chamber A will then pass through passage G and enter the chamber E at its upper end through the port J and thereby increase the pressure above piston 11, and being present in the lower end of chamber E below the piston by reason of the direct open communication afforded by the chamber F, the air pressure will then equalize on opposite sides of the piston 11 so that the latter will be acted on by the spring 14 and moved to its lowermost position to close ports C and D by the slide valve 13. On reduction or variation of pressure in the outlet chamber B and passage H the diaphragm 18 will be moved downwardly under the action of the spring 21 to a position depending on the extent of the reduction of pressure in the outlet chamber so as to shift the regulating valve 15 to open the port K and may move valve 15 to close the port J, as shown in Figure 6 under a heavy outlet discharge, but, when a slight or moderate outlet discharge is demanded the diaphragm will move the regulating valve to an intermediate position, as illustrated in Fig. 7, thus effecting either a full or graduated open communication between the upper portion of the piston chamber to the passage H and outlet chamber B and thereby effect a reduction of pressure from above the piston 11 assisted by the choking means in retarding inlet pressure to the upper end of the piston chamber. The air pressure beneath the piston 11 will then be in excess of that above the piston and will operate in opposition to the above reduced pressure and spring 14 to move the piston upwardly to a position corresponding to the open position of the regulating valve 15 and accordingly move the slide valve 13 to partially or fully open the ports C and D. Main reservoir pressure will then flow from the chamber A and chamber F through the ports C and D into the chamber B and outlet discharge at a constant or graduated rate until such time as the charging has been accomplished and the pressure in the chamber B will be raised sufficiently to restore the diaphragm 18 to normal in opposition to the spring 21, whereupon the spring 17 will act to insure the regulating valve 15 closing port K so that main reservoir pressure will then be permitted to increase in the chamber above the piston 11 to reestablish equalized pressures on opposite sides of the piston and permit the spring 14 to restore the piston and slide value to the normal position shown in Figure 5. Should the outlet discharge be increased or reduced, as illustrated in Figure 7, the varied oulet pressure will effect a precise graduated movement of the diaphragm 18, thereby effecting a synchronized graduated positioning of the regulating valve 15 and the slide valve 13, caused by the outlet discharge pressure operating the spring pressed diaphragm and thereby graduate the reduction or increase of pressure above piston 11, and the piston controlling spring 14 acting in unison with the regulating spring 21 effecting like responses, which will produce a balancing of the piston in the various charging positions of the charging valve, and thereby producing a graduated discharge of fluid pressure to the outlet chamber.

It has been found in practice that complete closing of the port J through which the air pressure is delivered to the upper end of the piston chamber is not essential. The flow of air from the intake chamber A to the passage I is choked and caused to flow at a slower rate and supplied through the port J in less volume than the rate of flow and volume exhausted through the port K; and accordingly the regulating valve may be formed as shown in Figure 10, or, by providing the choking means M' in the passage G as shown in Figure 11. The retardation or choking of the flow of air to the passage I may be provided at any convenient point between the regulating valve and the inlet chamber A. The choking device is provided for retarding the flow of inlet pressure to the upper end of the piston, which will permit a graduated reduction or increase of pressure above the piston to effect a graduated opening and closing of the slide valve, and thereby furnish the proper volume flow to the outlet chamber promptly on demand. This feature, coupled with the short stroke of the piston required to open or close the double ports C and D by the slide valve renders the charging valve extremely sensitive to variation in air pressures in the discharge chamber B and its communications and insures the maintaining of the air pressures on the discharge side of the charging valve uniform, thereby obviating variations of air pressure in the outlet chamber and its communications.

While I have specified my invention as applicable to air brake equipment on locomotives, it may obviously be employed wherever devices of this kind are serviceable, and while I have shown and described a specific embodiment of my invention, I do not limit myself to the exact details of construction shown, but may resort to such changes and modifications as occasion may require and as come within the spirit and scope of the appended claims.

I claim—

1. In a charging valve embodying a valve casing having inlet and outlet chambers, and formed with auxiliary passages leading from said chambers and terminating in superposed spaced relation, said valve casing being also provided with a piston chamber and a passage leading from said piston chamber having a termination interposed between the terminations of the first named passages and communicating therewith through opposed ports; a valve normally closing the port leading to the outlet passage, said valve having a cylindrical portion on its underside which projects into the port leading to the inlet passage with its circumferential surface extending proximate to but not touching the wall of the port thereby forming a choked passage through said port, said choked passage having a working area smaller than that of the port leading to the outlet passage, and said valve being adapted to be removed and replaced through said inlet port.

2. In a charging valve, a valve casing having inlet and outlet chambers, and formed with auxiliary passages leading from said chambers and terminating in superposed spaced relation, a piston chamber in said valve casing, a passage leading from said piston chamber having a termination interposed between the termination of the first named passages and communicating therewith through opposed ports; a double faced regulating valve, one of said faces of said regulating valve for normally closing the port leading from the piston chamber to the outlet passage, the other face on said regulating valve for closing the port leading from the inlet passage to the piston chamber when said charging valve is supplying a large volume of air to the outlet discharge, a cylindrical portion on said regulating valve projecting into the port leading to the inlet passage with its circumferential surface extending proximate to but not touching the wall of the port thereby forming a choked passage through said port, said choked passage having a working area smaller than that leading to the outlet passage whereby air flow through said choked passage will be retarded.

3. In a charging valve, a valve casing having inlet and outlet chambers, a passage leading from each of said chambers having portions extending in spaced relation to each other, an intermediate passage extending between said pair of passages, opposed ports leading from said intermediate passage to each of the pair of passages, a choking means in the passage leading from the inlet chamber to the intermediate passage, and a double faced valve arranged between the opposed ports, one face of said valve for closing the port leading from the inlet chamber when said charging valve is discharging a large volume of fluid pressure to the outlet chamber, and the other face of said valve for normally closing the port leading to the outlet chamber.

4. In a charging valve, a valve casing having inlet and outlet chambers, and formed with auxiliary passages leading from said chambers and terminating in superposed spaced relation, a piston chamber in said valve casing, a passage leading to said piston chamber having a termination interposed between the terminations of the first named passages and communicating therewith through opposed ports, and a regulating valve having a cylindrical portion projecting into the port leading to the inlet passage with its circumferential surface extending proximate to but not touching the wall of the port thereby forming a choked passage through said port, said regulating valve normally closing the port leading from the piston chamber to the outlet passage.

5. In a charging valve embodying a casing having inlet and outlet chambers, and portal communication between said chambers, a valve between the inlet and outlet chambers, a piston chamber in said casing the lower end in direct communication with said inlet chamber, a piston in said piston chamber connected to said valve, the under side of said piston being presented to inlet pressure only, a piston controlling spring above said piston, an auxiliary port and passage between the upper end of said piston chamber and the outlet chamber, an auxiliary passage between the inlet chamber and the upper end of the piston chamber, said inlet auxiliary passage being choked, a regulating valve arranged in said auxiliary port, and a regulating means arranged with a spring pressed diaphragm abutting said regulating valve.

6. In a charging valve embodying a casing having inlet and outlet chambers, and formed with a duplex port between said chambers, a slide valve arranged with said duplex port, a piston chamber in said casing, a piston in said piston chamber connected to said slide valve, the under side of said piston being directly presented to inlet pressure only, a piston controlling spring above said piston, a port and passage, between the upper end of the piston chamber and the outlet chamber, a choked communication between the inlet chamber and the upper end of the piston chamber, a regulating valve arranged in said port, and a spring pressed diaphragm abutting said regulating valve.

7. In a charging valve embodying a casing having inlet and outlet chambers, and a valve between said chambers, a piston chamber in said casing, a piston in said piston chamber connected to said valve, the under side of said piston being directly presented to inlet pressure only, a communication between the upper end of the piston chamber and the outlet chamber, a choked auxiliary passage leading from the inlet chamber to the upper end of the piston chamber, a regulating valve arranged in said first named communication, and a spring pressed regulating means abutting said regulating valve.

GEORGE E. MAIER.